United States Patent [19]

Burdick et al.

[11] Patent Number: 4,637,665
[45] Date of Patent: Jan. 20, 1987

[54] TRACK SHOES HAVING TOOTHED GROUSERS

[75] Inventors: Jon S. Burdick, N. Pekin; Paul T. Corcoran, Washington, both of Ill.

[73] Assignee: Caterpillar Inc., Peoria, Ill.

[21] Appl. No.: 797,293

[22] Filed: Nov. 12, 1985

[51] Int. Cl.[4] .............................................. B62D 55/28
[52] U.S. Cl. ..................................... 305/54; 301/44 B
[58] Field of Search ............. 301/44 R, 44 B; 305/54, 305/35 EB

[56] References Cited

U.S. PATENT DOCUMENTS

| | | |
|---|---|---|
| 1,165,178 | 12/1915 | Huffman . |
| 1,304,357 | 5/1919 | Norelius . |
| 1,409,577 | 3/1922 | Reyoum et al. . |
| 1,588,549 | 6/1926 | Harkness . |
| 1,622,111 | 3/1927 | Hawkins . |
| 1,635,597 | 7/1927 | White . |
| 1,693,831 | 12/1928 | Turnbull . |
| 1,822,132 | 9/1931 | Davis . |
| 1,829,945 | 11/1931 | Schmeiser . |
| 1,908,045 | 5/1933 | Olson . |
| 2,262,878 | 11/1941 | Bechman et al. . |
| 2,442,390 | 6/1948 | Williams ................................... 89/1 |
| 4,128,277 | 12/1978 | Meisel, Jr. ............................. 305/54 |

FOREIGN PATENT DOCUMENTS 963043 2/1975 Canada .................................. 305/54
85466 7/1965 France .................................. 305/54

OTHER PUBLICATIONS

Caterpillar, "The Development of Track Equipment for Snow and Ice Conditions", Dec. 4, 1952.

Primary Examiner—David A. Scherbel
Attorney, Agent, or Firm—Claude F. White

[57] ABSTRACT

A track assembly for a track-type vehicle has a plurality of first and second distinct individual track shoes joined together to form an endless loop. The first shoes have a projecting grouser bar which has a first plurality of teeth and the second shoes have a projecting grouser bar which has a second plurality of teeth. The first and second shoes are arranged in an alternating pattern with the teeth of the first shoes staggered relative to the teeth of the seocnd shoes. Conventional grousered track shoes generally provide track-type vehicles with sufficient surface traction for most work tasks of the vehicle. However, in some special work applications, the conventional grouser track shoes is inadequate to provide the required penetration to achieve sufficient tractive force. For such special work applications, the subject toothed grouser track shoes penetrate the surface and provide the necessary traction to effectively perform the work function.

9 Claims, 6 Drawing Figures

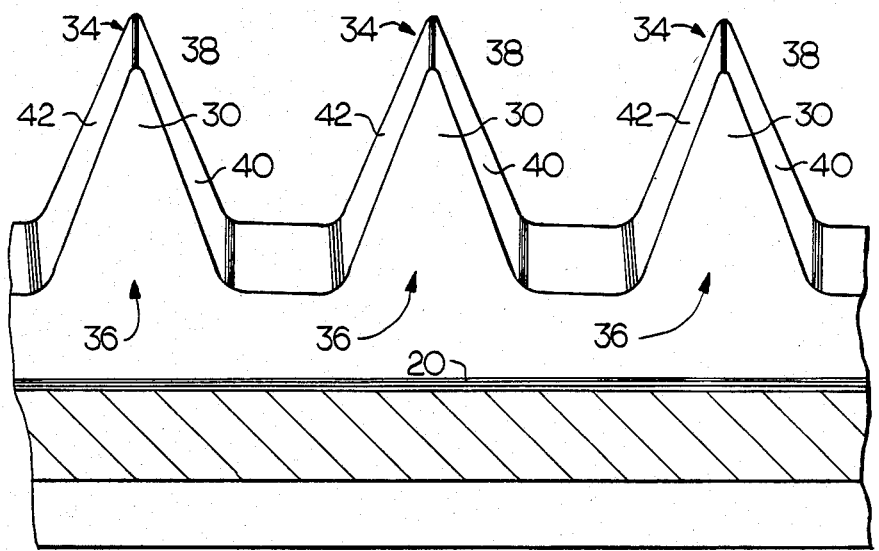
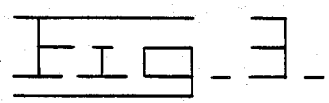

TRACK SHOES HAVING TOOTHED GROUSERS

DESCRIPTION

1. Technical Field

This invention relates generally to track shoes for endless track assemblies, and more particularly, to track shoes which have ground penetratable grousers, with the grousers having teeth for providing traction in hard slippery earth materials.

2. Background Art

Track-type vehicles used in construction and earthmoving industries utilize endless track assemblies for supporting and propelling the vehicles. The track assemblies include replaceable ground contactable track shoes, with the shoes generally having various types of outwardly extending ground penetratable grouser bars. The grouser bars are intended to penetrate the surface of the soil and provide the tractive force to enable the vehicle to perform its work function. In certain work conditions, such as ice, extremely hard compacted earth, and certain rocks and minerals, it is difficult for the track shoe grousers to penetrate sufficiently to provide adequate tractive effort. In such work conditions, the track assembly experiences slipping and the work vehicle is either inefficient or ineffective.

One particular type of work condition involves the ripping of gypsum, coals, talc, ice, permafrost, and certain limestones. These materials resist penetration of the conventional grouser bars into the surface, which thereby limits the tractive effort of the vehicle. Without sufficient tractive force, the ripper structure is unable to break up and dislodge the material. Gypsum is especially difficult to rip using conventional track-type vehicles due to its unique characteristics, which include massively bedded deposits with no cracks or layers, very little side breakout, highly plastic deformation, and slick shear surfaces.

One type of grouser for preventing track slip in conventional soils is disclosed in U.S. Pat. No. 1,588,549, issued to O. A. Harkness on June 15, 1926. In this patent, a separate grouser member is bolted to the track links. The grouser has a downwardly extending transverse projection which is intended to hold the links against slipping lengthwise of the track. Additionally, the grouser member has downwardly extending longitudinal calks which are intended to prevent the vehicle from slipping sideways.

Another type of bolt-on grouser is disclosed in U.S. Pat. No. 1,635,597 issued to R. H. White on July 12, 1927. The main object of this concept is to provide a grouser which is readily assembled to, or disassembled from, a track link. This grouser design is also intended to prevent the securing bolts from being subjected to excessive strains and stresses.

Still another type of tractor shoe having replaceable calks is disclosed in U.S. Pat. No. 1,908,045 issued to C. H. Olson on May 9, 1933. This tractor shoe has a plurality of reinforced holes for receiving various types of calks. It is intended that the calks can be removed when the tractor shoes are operated on improved roadbeds.

Each of the above-noted grousers would appear to provide tractive effort for a vehicle in normal type soils and work conditions. However, they would all appear to be ineffective in penetrating hard, slick materials, such as gypsum, talc, limestone, and certain coals.

A typical prior art grousered track shoe is shown in U.S. Pat. No. 4,128,277, issued to T. C. Meisel, Jr. on Dec. 5, 1978. The track shoe in this patent has a solid grouser bar extending the full width of the track shoe. The grouser bar of this type shoe penetrates into most soils and provides the required tractive force for a track-type vehicle to perform most work functions. However, this type of grouser bar is unable to penetrate into hard, slippery earth materials, such as gypsum, because the bar provides too much surface area. When a track-type vehicle, equipped with grousered track shoes of the above-noted type, attempts to perform a ripping operation in a material such as gypsum, the grousered shoes slip on the surface of the gypsum and the vehicle is unable to perform its ripping function.

The present invention is directed to overcoming one or more of the problems as set forth above.

DISCLOSURE OF THE INVENTION

In one aspect of the present invention, a track shoe for an endless track chain includes a generally rectangular shaped body which has a ground engageable surface, a leading end portion, and a pair of opposite edge portions. The shoe further includes an outwardly extending grouser bar formed integrally with the body and positioned adjacent the leading end portion of the shoe. The grouser bar extends across the ground engageable surface of the shoe between the opposite edge portions. The grouser has a plurality of equally spaced teeth with each tooth having a tip edge portion which tapers downwardly at an acute angle.

The grouser bars on conventional track shoes are intended to penetrate into the soil and provide the tractive force to enable the work vehicle to perform various work functions, such as bulldozing, land clearing, ripping, etc. However, in certain work situations, the work vehicle cannot perform its intended function due to the inability of the grouser bars to penetrate, and thereby provide the necessary tractive force. An example of such a work station involves the ripping of gypsum rock. Conventional grousered track shoes will not penetrate into the gypsum to provide the required tractive force to enable the ripper to break up and dislodge the material. The subject invention provides a solution to the above-noted problems by utilizing unique grousered track shoes to penetrate hard earth materials, and thereby enable the track shoes to produce the required tractive force.

BRIEF DESCRIPTION OF THE DRAWINGS

FIG. 3 is a diagrammatic rear elevational view, partly in section, of a portion of one of the grousered track shoes, taken generally along the lines III—III of FIG. 2;

BEST MODE FOR CARRYING OUT THE INVENTION

Figure 1:
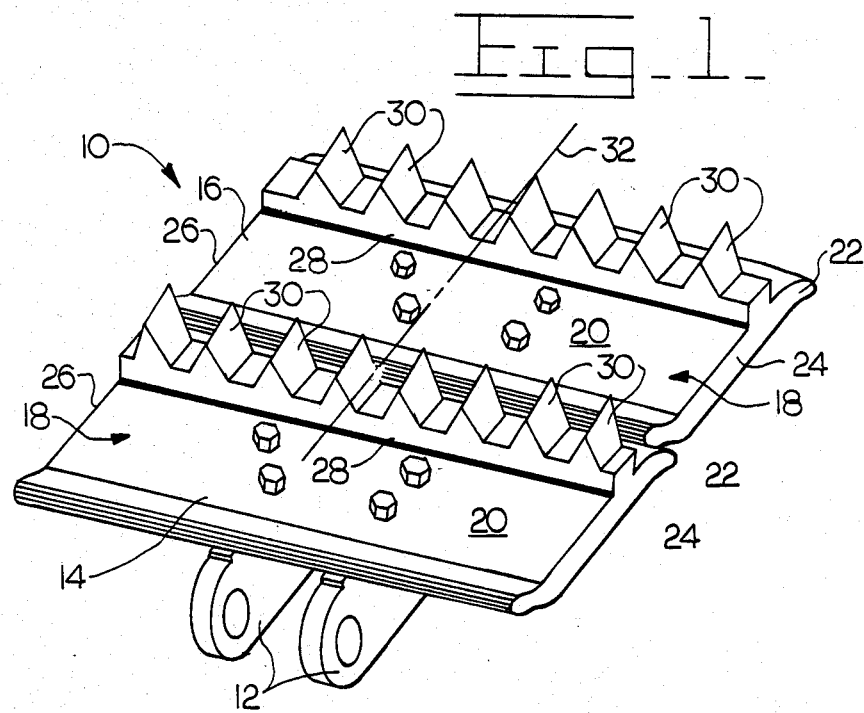
FIG. 1 is a diagrammatic perspective view of a portion of an endless track assembly incorporating grousered track shoes of the present invention.

Referring to the drawings, a track assembly 10 includes a plurality of pivotally interconnected track links 12, and a plurality of first and second track shoes 14,16. Each of the first and second shoes 14,16 has a generally rectangularly shaped body 18 having a ground engageable surface 20, a leading end portion 22, and first and second edge portions 24,26. Each of the shoes 14,16 has a grouser bar 28 formed integrally with the body 18 and extending outwardly from the ground engageable surface 20. The grouser bar 28 is offset toward the leading end portion 22 of each shoe 14,16 and extends across the ground engageable surface 20 between the first and second edge portions 24,26. All of the first track shoes 14 in the track assembly 10 are substantially similar and all of the second track shoes 16 in the track assembly 10 are substantially similar. The first shoes 14 are joined to selected ones of the track links 12 and the second shoes 16 are joined to other selected ones of the track links 12. The first and second shoes 14,16 are joined to the links 12 in an alternating arrangement.

For vehicles weighing between about 40,000 lbs. to 200,000 lbs, each of the grouser bars 28 has an overall height dimension "H" in the range of about 2.4 to 4.5 inches (60 to 115 mm). The grousered track shoes 14,16 are intended to be used on various sizes of track-type vehicles and dimension "H" of the grouser bar 28 will be different for different size vehicles. However, for specific vehicles in the above weight classes, if the height dimension "H" is substantially less than 2.4 inches (60 mm), the grouser bar 28 would generally not be able to provide the necessary tractive reactive force for the vehicle to perform efficiently. If the height dimension "H" is substantially greater than 4.5 inches (115 mm), then it would be difficult for the grouser bar 28 to penetrate fully into earth surface, and again tractive effort would be reduced. Also, if dimension "H" substantially exceeds 4.5 inches (115 mm), the grouser bar 28 is more susceptible to bending and breakage. It is entirely possible that the subject grousered track shoes 14,16 could be advantageously used on vehicles smaller than about 40,000 lbs. and larger than about 200,000 lbs. on such vehicles, the height dimension "H" of the grouser bars 28 would be sized proportionately.

Figure 6:
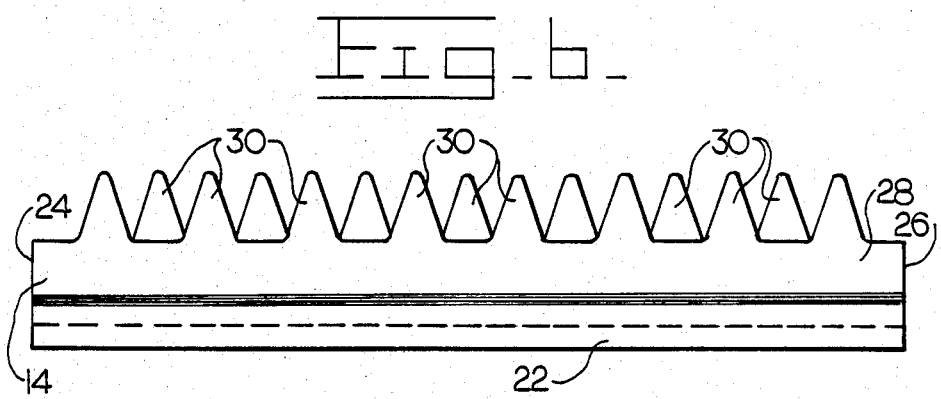
FIG. 6 is a diagrammatic front elevatinal view of the grousered track shoes shown in FIGS. 4 and 5, as they appear in place in a track assembly.

Each of the grouser bars 28 has a plurality of teeth 30, which are substantially equally spaced along the bar 28. Each tooth 30 of shoe 14, and each tooth 30 of shoe 16, has a size and shape which is substantially similar to each adjacent tooth 30. In the embodiment illustrated in the drawings, the first shoe 14 has an even number of teeth 30, and the second shoe 16 has an uneven number of teeth 30. The exact number of teeth 30 on the shoes 14,16 is dependent on the size of the work vehicle and the type of work application. It is important, however, that the first teeth on shoe 14 be staggered relative to the second teeth on shoe 16. This arrangement is apparent from FIG. 6, which shows that the open paths between adjacent teeth 30 of the first shoe 14 are blocked by the teeth 30 of the second shoe 16. This relationship can also be seen in FIG. 1, which shows a centerline 32 of the track assembly 10 bisecting the open path between teeth 30 of the first shoe 14 and bisecting the central tooth 30 of the second shoe 16.

Figure 2:
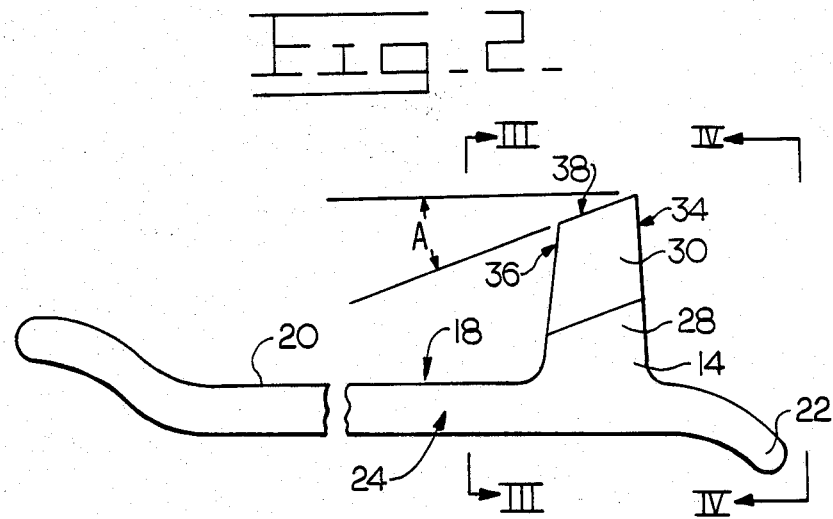
FIG. 2 is a diagrammatic side elevational view of one of the grousered track shoes of the present invention.
Figure 4:
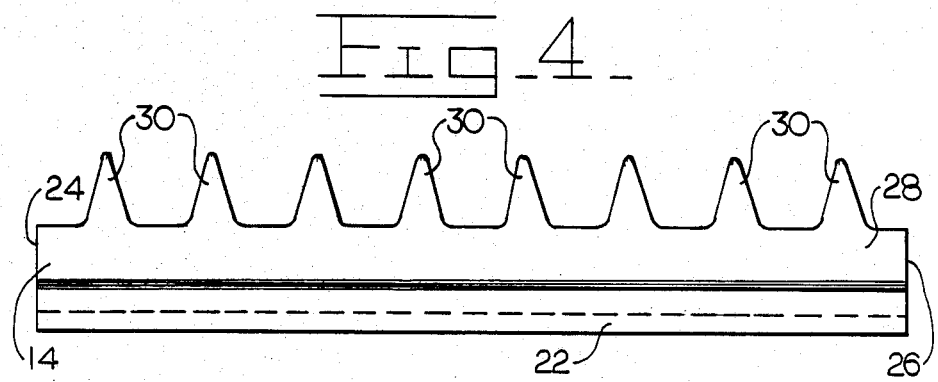
FIG. 4 is a diagrammatic front elevational view of one of the grousered track shoes, taken generally along the lines IV—IV of FIG. 2.
Figure 5:
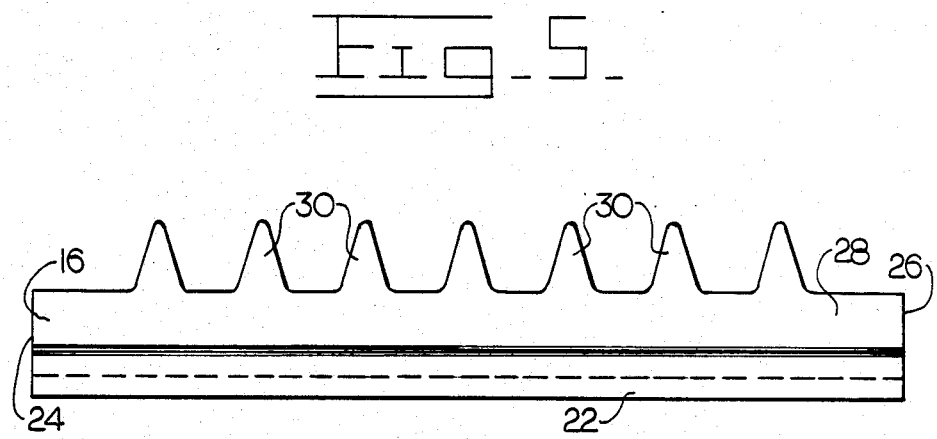
FIG. 5 is a diagrammatic front elevational view similar to FIG. 4 and illustrating a different grousered track shoe of the present invention.

As best shown in FIGS. 1, 2, and 3, each tooth 30 of the shoes 14,16 is generally triangularly shaped and has a leading end portion 34, a trailing end portion 36, and a relatively sharp tip edge 38 between the end portions 34,36. The tip edge 38 of each tooth 30 slopes downwardly at an acute angle "A" toward the ground engageable surface 20 from the leading end portion 34 to the trailing end portion 36. Angle "A" is preferably within the range of about 10 to 30 degrees, and in the illustrated embodiment is about 20 degrees. Angle "A" makes each tooth 30 more aggressive and provides that the grouser bar 28 will penetrate readily into a ground surface. The angle "A" also provides a "sink-slippage" characteristic to the teeth 30, which insures that each tooth 30 will penetrate further into the surface if slippage of the track assembly 10 occurs, thereby increasing tractive effort. If angle "A" is less than about 10 degrees, the teeth 30 will have less tendency to penetrate and the "sink-slip" characteristic will be reduced. If angle "A" is greater than about 30 degrees, the tip edge 38 becomes too pointed at the leading end portion and is subject to premature dulling and breakage.

As shown in FIG. 3, each of the teeth 30 has first and second side surfaces 40,42, which converge at an angle from the leading end portion 34 toward the trailing end portion 36. This provides that the tip edge 38 is relatively sharp. It is important that the tip edge 38 be relatively sharp in order for the teeth 30 to penetrate into the earth materials. Each of the teeth 30 also has a height dimension "h", which is in the range of about 45 to 75 percent of the height dimension "H" of the grouser bar 28. If the dimension "h" is less than about 45 percent of dimension "H", the teeth 30 will not be able to penetrate deep enough to provide the necessary tractive force. If the dimension "h" is greater than about 75 percent of the dimension "H", then very little of the grouser bar 28 remains between the teeth 30, beam strength of the grouser bar 28 is reduced, and tractive force is reduced when the grouser bars 28 penetrate fully into a surface. In the embodiment illustrated, the dimension "h" is about 60 percent of dimension "H".

INDUSTRIAL APPLICABILITY

The subject track assembly 10 is particularly useful with track-type vehicles working in hard slippery materials, such as gypsum, coals, talc, ice, permafrost, certain limestones, and other like materials. The subject track shoes 14,16, having toothed grouser bars 28, can penetrate such materials and provide the necessary tractive force to enable the vehicle to perform various work tasks, including ripping of the above-noted mineral deposits.

The ripping of gypsum, and like materials, is generally not possible using conventional track-type vehicles. The conventional grousered track shoes will not penetrate the gypsum and the vehicle has insufficient tractive force to pull the ripper through the material to dislodge and break it up. Because the conventional grousered shoes will not penetrate the gypsum surface, the grousers will slip on the surface and track assembly will rotate without providing tractive force.

A track-type vehicle equipped with the subject toothed grouser shoes will be able to rip the gypsum because the grouser teeth penetrate the surface of the gypsum, and thereby provide the required tractive force. As an example, a track-type vehicle having a weight of about 200,000 lbs., 28 inch wide conventional track shoes with 1 inch wide grousers, and 30 total grousers in contact with the surface, will generate about 238 lbs. per square inch. Contact pressure equipping the same 200,000 lb. vehicle with the subject shoes having toothed grousers will generate about 2380 lbs. per square inch of contact pressure (assuming approximately 0.5 inch penetration of each tooth and 210 teeth in contact with the surface). This is about ten times the penetration force generated by the conventional grousered track shoes. With this increased penetration, drawbar force no longer depends on the coefficient of friction alone, but now utilizes the internal strength of the earth material as well.

The subject first and second shoes 14,16 are joined to the links 12 in an alternating pattern with teeth 30 on the first shoe 14 staggered relative to the teeth 30 on the second shoe 16. This arrangement of shoes 14,16 and teeth 30 provides that should any slippage of the track shoes 14,16 take place, slippage on the length of two full track shoes 14,16 would have to occur before there was no original surface left to grip by the teeth 30. Also, if slippage in excess of two full track shoes 14,16 does occur, all of the original gripping surface will have been removed, and the teeth 30 will always have competent material to grip and engage.

The tip edge 38 on each tooth 30 slopes downwardly from the leading end portion 34 toward the trailing end portion 36 at an acute angle to produce a leading edge joint and the "sink-slippage" characteristic to the track assembly 10. This characteristic provides that when slippage of the track assembly 10 takes place, each tooth 30 will penetrate further into the material, thereby increasing tractive effort.

Other aspects, objects, and advantages of this invention can be obtained from a study of the drawings, the disclosure, and the appended claims.

We claim:

1. A track shoe for an endless track assembly, comprising:
   a generally rectangularly shaped body having a ground engageable surface, a leading end portion, and first and second edge portions;
   a grouser bar formed integrally with said body and extending outwardly away from said ground engageable surface, said grouser offset toward said leading end portion and extending across said ground engageable surface between said first and second edge portions;
   said grouser having at least four teeth substantially equally spaced across said grouser, each tooth having a leading end portion, a trailing end portion, and a tip edge between said leading and trailing end portions, said tip edge being in a plane which is substantially parallel to said first and second edge portions and tapering downwardly at an acute angle relative to said ground engageable surface from said leading end portion to said trailing end portion, said angle being in the range of 10 to 30 degrees.

2. The track shoe of claim 1, wherein said grouser bar has a height dimension and each of said teeth has a height dimension in the range of about 45% to 75% of the height dimension of said grouser bar.

3. The track shoe of claim 1, wherein said angle is an angle of about 20 degrees.

4. A track assembly having a centerline, comprising:
   a plurality of pivotally interconnected track links;
   a plurality of substantially similar first track shoes, each having a ground engageable surface and a grouser bar extending outwardly of said surface, said grouser bar having a plurality of first teeth substanially equally spaced across said grouser bar, said first shoes being joined to selected ones of said links;
   a plurality of substantially similar second track shoes, each having a ground engageable surface and a grouser bar extending outwardly of said surface, said grouser bar having a plurality of second teeth substantially equally spaced across said grouser bar, said second shoes being joined to other selected ones of said links;
   said first and second shoes being joined to said links in an alternating arrangement with said first teeth staggered relative to said second teeth; and
   each of said first and second teeth having a leading end portion, a trailing end portion, and a tip edge between said leading and trailing end portions, said tip edge being in a plane which is substantially parallel to said track assembly centerline and sloping toward said ground engageable surface at an acute angle.

5. The track assembly of claim 4, wherein said acute angle is an angle in the range of 10 to 30 degrees.

6. The track assembly of claim 4, wherein said acute angle is an angle of about 20 degrees.

7. The track assembly of claim 4, wherein said grouser bar has a height dimension and said teeth have a height dimension in the range of about 45 to 75 percent of said dimension.

8. The track assembly of claim 4, wherein said grouser bar has a height dimension and said teeth have a height dimension of about 60% of the height dimension of said grouser bar.

9. The track assembly of claim 4, wherein each of said grousered teeth has a size and shape which is substantially similar to each adjacent grousered tooth.

* * * * *